United States Patent
Hofsaess et al.

(10) Patent No.: US 6,517,170 B1
(45) Date of Patent: Feb. 11, 2003

(54) BREAKING SYSTEM AND METHOD FOR CONTROLLING AND/OR MONITORING A PUMP OF A BREAKING SYSTEM

(75) Inventors: Michael Hofsaess, Vaihingen/Enz (DE); Ulrich Gottwick, Stuttgart (DE); Paul Eberhard Schunck, deceased, late of Landau in der Pfalz (DE), by Gabriele Berta Helene Kiefer-Schunck, Janik Schunck, Axel Schunck, Niels Schunck legal representatives.

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/701,597

(22) PCT Filed: Mar. 17, 2000

(86) PCT No.: PCT/DE00/00856

§ 371 (c)(1),
(2), (4) Date: Jul. 24, 2001

(87) PCT Pub. No.: WO00/59762

PCT Pub. Date: Oct. 12, 2000

(30) Foreign Application Priority Data

Mar. 30, 1999 (DE) .......................................... 199 14 403

(51) Int. Cl.$^7$ ............................................. B60T 13/18
(52) U.S. Cl. ........................................... 303/11; 303/10
(58) Field of Search ....................... 303/10, 11, 122.09, 303/122.12, 115.4

(56) References Cited

U.S. PATENT DOCUMENTS

| | | | |
|---|---|---|---|
| 5,317,870 A | | 6/1994 | Shinichi |
| 5,454,632 A | * | 10/1995 | Burgdorf et al. .......... 303/115.4 |
| 5,779,328 A | * | 7/1998 | Mergenthaler et al. 303/122.12 |
| 5,791,745 A | | 8/1998 | Yuichiro |
| 5,902,020 A | * | 5/1999 | Drott ...................... 303/122.09 |
| 6,095,620 A | * | 8/2000 | Dillard et al. ................. 303/11 |
| 6,155,653 A | * | 12/2000 | Borchert ....................... 303/11 |
| 6,158,825 A | * | 12/2000 | Schunk et al. ........... 303/115.4 |

FOREIGN PATENT DOCUMENTS

| | | |
|---|---|---|
| DE | 44 05 672 | 8/1995 |
| DE | 195 48 248 | 6/1997 |
| DE | 196 38 196 | 7/1997 |
| WO | WO 97 05001 | 2/1997 |

* cited by examiner

Primary Examiner—Christopher P. Schwartz
(74) Attorney, Agent, or Firm—Kenyon & Kenyon

(57) ABSTRACT

A brake system in which a hydraulic fluid can be conveyed from an accumulator via a valve into individual wheel brake cylinders, the hydraulic fluid being conveyed by a pump into the accumulator, having a pressure sensor arranged on the outlet side of the pump for detecting pressure pulsations in the hydraulic fluid arising in the operation of the pump and having an arrangement for evaluating the pressure pulsations in order to obtain a measuring signal for controlling and/or monitoring the pump.

9 Claims, 2 Drawing Sheets

BREAKING SYSTEM AND METHOD FOR CONTROLLING AND/OR MONITORING A PUMP OF A BREAKING SYSTEM

FIELD OF THE INVENTION

The present invention relates to a brake system as well as to a method for controlling and/or monitoring a brake system pump.

BACKGROUND INFORMATION

German Patent 195 48 248 A1 describes a method and a device for controlling a pump of an electrohydraulic brake system. In the brake system, a hydraulic fluid is conveyed from an accumulator via a valve means to the individual wheel brake cylinders, the hydraulic fluid being conveyed to the accumulator by a pump. In order that the loading of the accumulator by the pump be as noiseless as possible, the pump can be driven at a mark-to-space ratio that can be stipulated in accordance with need.

German Published Patent Application No. 196 38 196 describes a system for monitoring a brake system having a controllable hydraulic pump that is located in a hydraulic circuit, and having at least one solenoid valve whose operating state can be altered in accordance with a control signal. In this context, by altering the operating state of the solenoid valve, the resistance to flow in the hydraulic circuit is influenced. Monitoring elements are provided which, when predetermined operating conditions exist, actuate a display device to indicate a fault, as a function of a detected slowing of the hydraulic pump in varying operating states of the solenoid valve.

For safety reasons, the pressure supply, is monitored especially in electrohydraulic brake systems. For this purpose, the absolute system pressure is continually monitored with respect to threshold values, as is the pressure and the pressure change rate when the accumulator is loading. While the pressure is being regulated (for example, in the context of an anti-locking system or an anti-spin regulation system), the result is that the accumulator undergoes a volume drain, which is impossible or at best very difficult to measure. When there is a simultaneous reloading of the accumulator, it proves impossible in conventional systems to carry out a precise monitoring of the pump effectiveness. In conventional systems, conclusions about the operation or the effectiveness of the pump can only be formed on the basis of a pressure increase in the accumulator.

In order to avoid generating noise, a pump of this type is not driven at 100% during a loading operation, but is generally operated in a clocked manner. However, during travel, a noise generated by the clocked pump is noticeable and disturbing, in particular when rotational speeds change, whereas noise is significantly less noticeable at a constant rotational speed.

SUMMARY OF THE INVENTION

An object of the present invention is to create a brake system in which the pump operation can be reliably monitored in a simple manner. In addition, it is the goal to make available a brake system that produces noise at as low a level as possible.

According to the present invention, it is possible, in particular, to operate an electrohydraulic brake system such that the pump effectiveness, i.e., particularly the pump rotational speed and the pump performance, can be evaluated and monitored even during a simultaneous volume drain from the accumulator. In addition, by determining the pump rotational speed, which is made simple by the present invention, a phase-regulated driving of the pump is possible in order to minimize the disturbing noises by improving the pump clocking. During the operation of the pump, pressure pulsations are generated whose temporal curve mirrors the periodic opening of the discharge valve of the pump, i.e., in an electrohydraulic brake system, for example, the accumulator loading pump. In this context, the period duration of the pulsations or the corresponding measuring signal corresponds to the duration of one revolution of the pump. The maximum fluctuation level is a measure for the pump performance at a preselected elasticity on the pump outlet side and at a preselected temperature of the hydraulic fluid or of the pressure medium. In a typical brake system, e.g., an electrohydraulic one, the clocked pump operates, for example, at rotational speeds of roughly 1500–3000 rpm, which corresponds to a period duration of 20–40 ms.

According to one preferred embodiment of the brake system according to the present invention, the pressure sensor is arranged directly at the outlet of the pump. As a result of this arrangement, and despite the presence of elasticities which are caused, for example, by reservoirs provided in the brake system and/or by bore holes, pressure pulsations can be measured in a very precise and reliable manner.

According to one preferred embodiment of the method according to the present invention, a smoothing-out, as well as an offset compensation, is carried out on a measuring signal obtained as a result of detecting the pressure pulsations. At pump rotational speeds of 1500–3000 rpm, it is possible to smooth out the signal, for example, by reading in the pressure sensor signal sufficiently frequently, for example, every 2 ms. An offset compensation can be achieved as a result of the fact that this signal has subtracted from it a signal that is filtered over a long term, for example, the average value of the signal over the immediately preceding 40–80 ms. In this context, the time duration between two positive zero crossings is a measure for the period duration. The maximum value, or the amplitude of the signal obtained in this manner, depending on the temperature of the pressure medium, is a direct function of the pump performance. For example, by comparing the measured signal values with the stored table values, it can be evaluated as to whether the pump performance conforms with the specified values, and therefore whether the pump is functioning normally.

It has proven to be advantageous to operate the pump in a clocked manner and to drive it at a time point that can be stipulated, in accordance with a zero crossing and/or an extreme value of the smoothed-out or offset-compensated measuring signal. As result of this measure, it is possible to minimize structure-born sound generation from the point of view of noise intensity. The pump can be operated particularly quietly if it is driven in a phase-correct manner.

According to the present invention, it is possible, in a simple manner, to monitor the efficiency of the pump on the basis of the level of the detected pressure pulsations, or of the amplitude of the measuring signal that is generated from this source.

DETAILED DESCRIPTION

Figure 1:
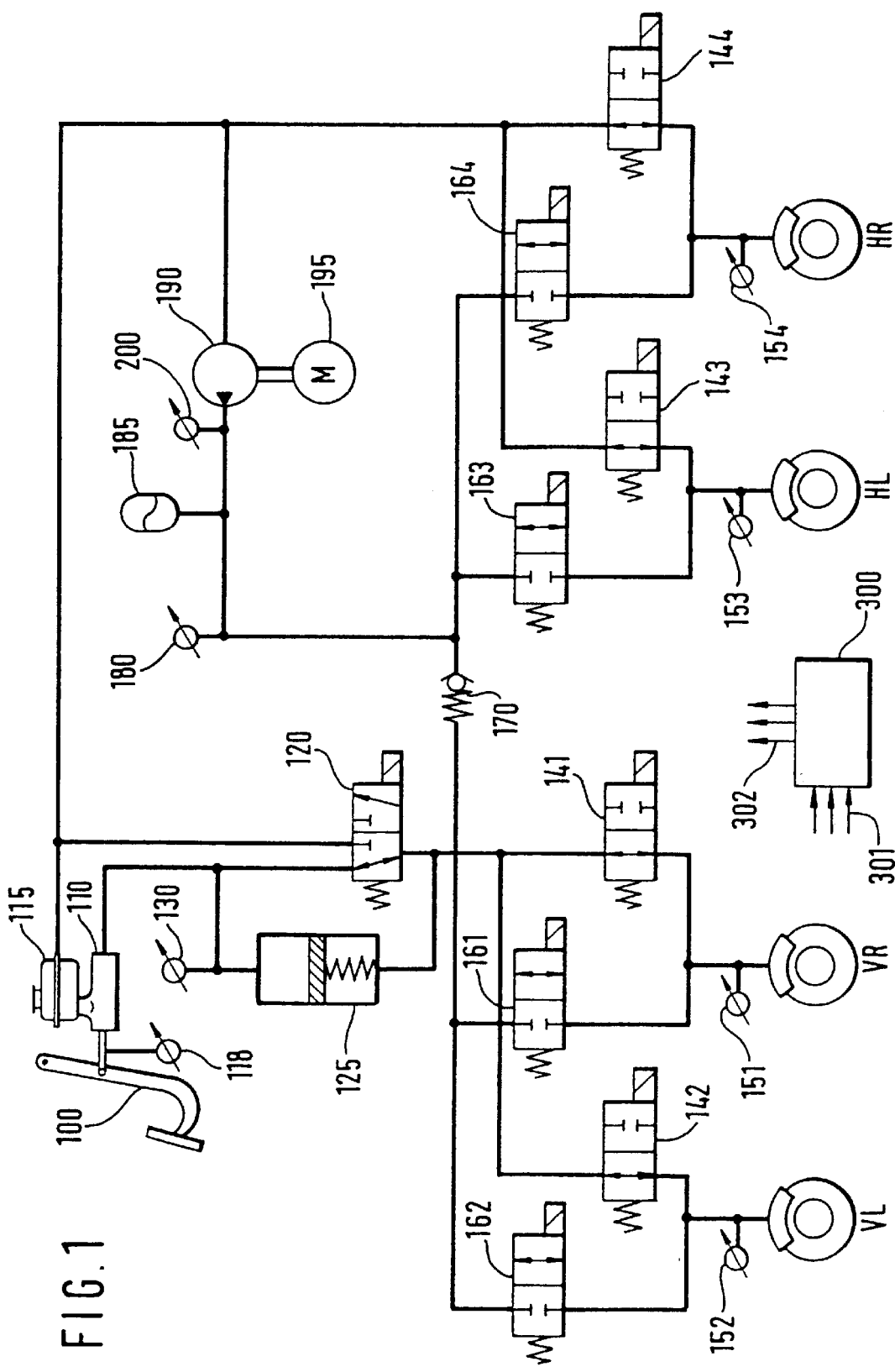
FIG. 1 depicts a block diagram to illustrate the elements of an electrohydraulic brake system according to the present invention.

In the depicted brake system, a brake pedal is designated as reference numeral 100. Via the brake pedal, pressure can be built up in a master brake cylinder 110. Using a pedal travel sensor 118, the motion of the brake pedal can be detected. Master brake cylinder 110 is in contact with a reservoir 115. Master brake cylinder 110 is connected to a safety valve 120, which in the depicted position is located in its non-current-receiving state. A pedal travel simulator 125 is connected parallel to the safety valve.

In the connecting line between master brake cylinder 110 and safety valve 120, or pedal travel simulator 125, a pressure sensor 130 is arranged that makes available a signal which registers pressure PHZ in the master brake cylinder.

In the non-current-receiving state, safety valve 120 enables the connection between the master brake cylinder and discharge valves 141 and 142. The discharge valves, also in their non-current-receiving state, are connected in the pass direction and they enable the connection to the wheel brake cylinders.

Discharge valve 141 is assigned to wheel brake cylinder VR of the right front wheel, and discharge valve 142 is assigned to wheel brake cylinder VL of the left front wheel. The pressure in the wheel brake cylinders can be measured by sensors 151, 152.

In addition, the wheel brake cylinders are in contact with an accumulator 185, via intake valves 161 and 162 and a check valve 170. The pressure in accumulator 185 can be measured using a pressure sensor 180. Intake valve 161 is assigned to the right front wheel, and intake valve 162 is assigned to the left front wheel.

Accumulator 185 is also in contact, via intake valves 163 and 164, with wheel brake cylinder HL of the left rear wheel and with wheel brake cylinder HR of the right rear wheel, respectively. The wheel brake cylinders of the left rear wheel and of the right rear wheel are in turn in contact with reservoir 115 via discharge valves 143 and 144, respectively.

Discharge valves 141 and 142, via safety valve 120, can also be brought into contact with reservoir 115.

A pump 190, driven by a pump motor 195, conveys the hydraulic fluid from reservoir 115 into accumulator 185.

On the outlet side of pump 190, i.e., between pump 190 and reservoir 185, a further pressure sensor 200 is provided. Using this pressure sensor 200, pressure pulsations in the hydraulic fluid caused by the operation of the pump can be detected. The temporal curve of the pressure pulsations mirrors the periodic opening of the discharge valve (undepicted in detail) of pump 190. The determined pressure fluctuation signals can be fed to a control unit 300, which carries out an appropriate signal processing. This control unit 300 is advantageously a control unit that controls and regulates the entire operation of the depicted electrohydraulic brake system, i.e., the driving of the pump, the other pressure sensors, and the valves. Input signal lines and output signal lines of control unit 300 are designated as 301 and 302, respectively. For the sake of the clarity of the drawing, the signal lines that communicate with signal lines 301, 302 and are connected to pressure sensor 200 or to the other elements of the depicted brake system are not depicted in detail.

The depicted electrohydraulic brake system operates as follows:

In normal operation, safety valve 120 receives current. Safety valve 120 enables the connection between reservoir 115 and the discharge valves and interrupts the connection between master brake cylinder 110 and discharge valves. When the driver actuates brake pedal 100, then sensor 118 determines the signal that corresponds to the pedal travel of brake pedal 100 and/or sensor 130 delivers a pressure signal reflecting the pressure in the master brake cylinder.

On the basis of at least one of these signals, which reflect the input of the driver, as well as of any further operational variables, control unit 300 determines the driving signals for impacting on intake valves 161, 162, 163, and 164 as well as on discharge valves 141, 142, 143, and 144.

When pump motor 195 receives current, pump 190 is driven, and it conveys hydraulic fluid from reservoir 115 into accumulator 185. The consequence of this is that the pressure in accumulator 185 rises, as measured by pressure sensor 180. By opening intake valves 161 through 164 and by closing discharge valves 141 through 144, the pressure in the wheel brake cylinders is increased in accordance with the input of the driver. By opening the discharge valves and closing the intake valves, the pressure in the wheel brake cylinders can be decreased in accordance with the pedal actuation.

It is particularly advantageous to measure the pressure in the wheel brake cylinders using pressure sensors 151 through 154. In this case, pressure regulation and/or fault monitoring is possible.

Pedal travel simulator 125 brings it about that the driver feels on brake pedal 100 an appropriate force, which would arise in a corresponding actuation of the brake pedal in a conventional brake system.

In the event of the failure of the device, safety valve 120 loses its current and enables the connection between master brake cylinder 110 and wheel brake cylinders of front wheels VL, VR. Thus the driver, via the brake pedal, has direct influence on the wheel brake cylinders of the front wheels.

To a sufficient extent pump, 190 conveys hydraulic fluid into the accumulator so that sufficient brake pressure is available. The monitoring of the pump operation can be carried out using pressure sensor 200. It should be noted that it is possible to dispense with the aforementioned pressure sensor 180 because, on the basis of the signal, filtered over a long term, from pressure sensor 200, information exists regarding the loading of the accumulator. In this context, the period duration of the measured pressure pulse signal corresponds to the pump revolution period. The maximum fluctuation level, i.e., the amplitude of the measuring signal, represents a measure for the pump performance at a preselected elasticity on the pump outlet side and at a preselected temperature of the pressure medium. Using appropriate signal processing procedures to be carried out in control unit 300, continual monitoring of the pump performance is therefore possible, especially during a simultaneous volume drain from reservoir 185. The temperature of the electrohydraulic brake system, i.e., especially the temperature of the hydraulic fluid, can be measured, for example, using a temperature measuring device provided in pressure sensor 200. Temperature measuring devices of this type can also be provided in further pressure sensors used in the depicted brake system. A temperature signal measured in this manner can also be fed to the control unit so that the measured pressure pulse signal for a given temperature can be compared with table values stored in the control unit. Therefore, in a simple and inexpensive manner, it can be determined whether the pump performance conforms to the stored, i.e., specified, values. Providing pressure sensor 200, as in the present invention, also permits a phase-regulated driving of pump 190, as a result of which it is possible to minimize the noise generated by pump 190. Due to the fact that the rotational speed of pump 190 can be measured in a simple and reliable manner by pressure sensor 200, this rotational speed can be used as a reference variable in the pump regulation. In general, by arranging pressure sensor 200 on the outlet side of pump 190, the efficiency of the pump can be continually monitored, and the pump can be operated in a low-noise manner at a substantially constant rotational speed and/or in phase-correct driving.

Figure 2:
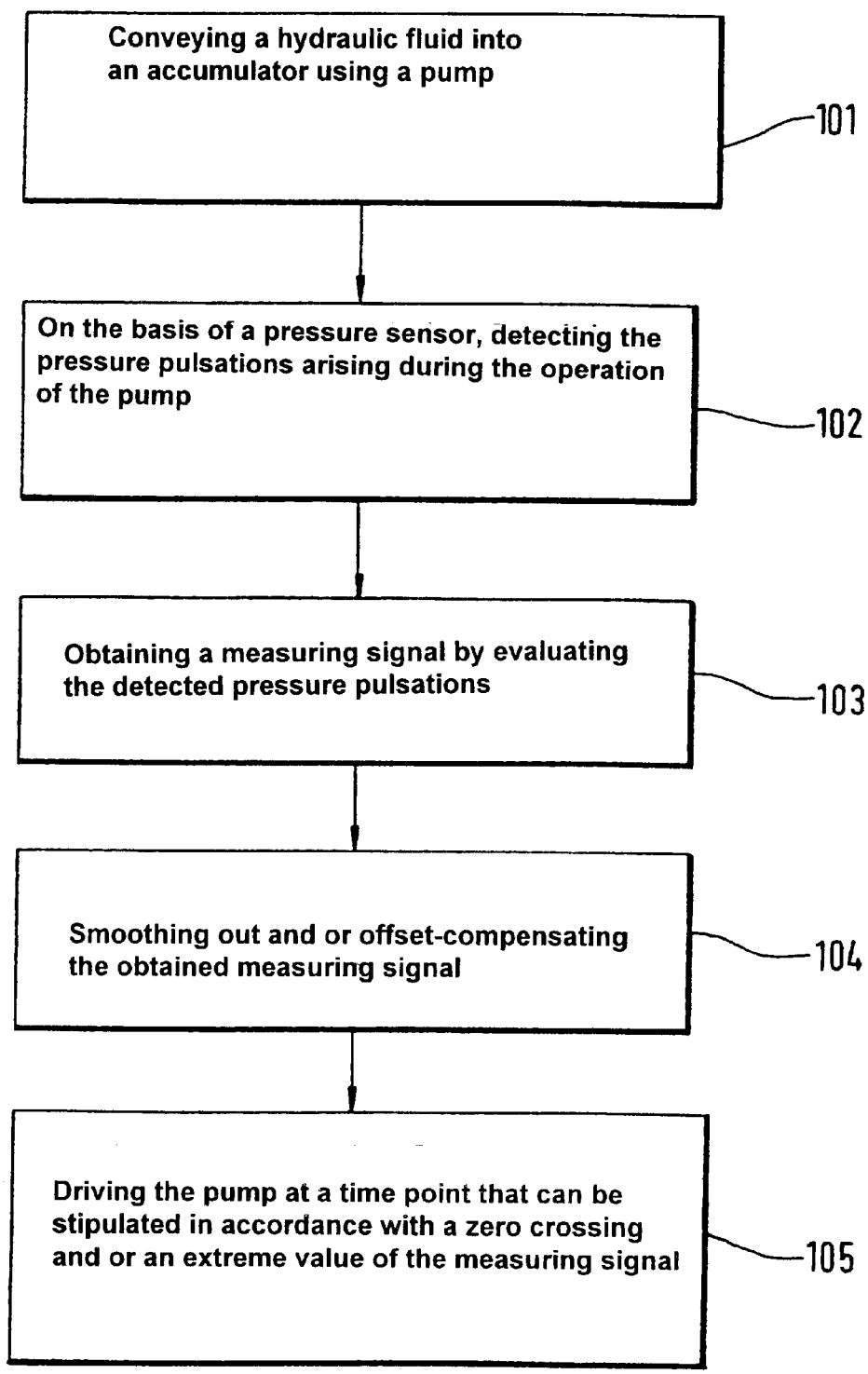
FIG. 2 depicts a flowchart to illustrate the method according to the present invention.

The method according to the present invention is once again depicted in the flowchart of FIG. 2. In this context, in a step 101, hydraulic fluid is conveyed into accumulator 185 by pump 190. Immediately thereafter, in a step 102, a determination is carried out using pressure sensor 200 of the pressure pulsations arising in the operation of the pump. In a further step 103, on the basis of an evaluation of the detected pressure pulsations, a measuring signal for controlling and monitoring the pump performance is obtained. In a subsequent step 104, a smoothing out and/or an offset compensation of the obtained measuring signal is carried out. On the basis of this smoothed-out or offset-compensated measuring signal, in a step 105, the driving of the pump takes place at a time point that can be stipulated in accordance with a zero crossing and/or an extreme value of the measuring signal.

The device and the method are not limited to the electrohydraulic brake system employed in the exemplary embodiment. Rather, the present invention can be used in any brake systems in which, at the outlet of the element conveying the pressure medium, especially a pump, pressure pulsations can be measured, for example, in a sensory manner and thus evaluated.

What is claimed is:

1. A brake system, comprising:
   an accumulator;
   a pump for conveying a hydraulic fluid into the accumulator;
   a valve arrangement via which the hydraulic fluid is capable of being conveyed from the accumulator into a wheel brake cylinder;
   a pressure sensor arranged on an outlet side of the pump and for detecting a pressure pulsation arising in the hydraulic fluid during an operation of the pump; and
   an arrangement for evaluating the pressure pulsation to obtain a measuring signal for at least one of controlling and monitoring the pump.

2. The brake system according to claim 1, wherein:
   the brake system corresponds to an electrohydraulic brake system.

3. The device according to claim 1, wherein:
   the pressure sensor is arranged directly at an outlet of the pump.

4. The brake system according to claim 1, wherein;
   the pressure sensor is arranged between the pump and the accumulator.

5. A method for at least one of controlling and monitoring a pump of a brake system, comprising the steps of:
   causing a pump to convey a hydraulic fluid into an accumulator;
   conveying the hydraulic fluid from the accumulator via a valve arrangement into a wheel brake cylinder; and
   detecting and evaluating a pressure pulsation arising during an operation of the pump in order to obtain a measuring signal for at least one of controlling and monitoring the pump.

6. The method according to claim 5, further comprising the step of:
   performing at least one of a smoothing out and an offset compensation of the measuring signal.

7. The method according to claim 6, further comprising the steps of:
   operating the pump in a clocked manner; and
   driving the pump at a time point that can be determined in accordance with at least one of a zero crossing and an extreme value of the at least one of smoothed-out and offset-compensated measuring signal.

8. The method according to claim 5, wherein:
   the brake system corresponds to an electrohydraulic brake system.

9. The method according to claim 5, further comprising the step of:
   monitoring an efficiency of the pump on the basis of one of a level of the detected pressure pulsation and an amplitude of the measuring signal.

* * * * *

UNITED STATES PATENT AND TRADEMARK OFFICE
CERTIFICATE OF CORRECTION

PATENT NO.    : 6,517,170 B1                                                          Page 1 of 1
DATED         : February 11, 2003
INVENTOR(S)   : Michael Hofsaess et al.

It is certified that error appears in the above-identified patent and that said Letters Patent is hereby corrected as shown below:

<u>Title page, Item [54] and Column 1, lines 1-3,</u>
Change title from "BREAKING SYSTEM AND METHOD FOR CONTROLLING AND/OR MONITORING A PUMP OF A BREAKING SYSTEM" to -- BRAKE SYSTEM AND METHOD FOR CONTROLLING AND/OR MONITORING A BRAKE SYSTEM PUMP --

<u>Column 1,</u>
Line 13, change "German Patent 195 48 248 A1 describes" to -- German Published Patent Application No. 195 48 248 describes --
Line 16, delete "means"
Line 34, change "supply, is monitored" to -- supply is monitored, --

Signed and Sealed this

Fifteenth Day of June, 2004

JON W. DUDAS
*Acting Director of the United States Patent and Trademark Office*